Feb. 6, 1945.  V. J. LEVAGGI, JR  2,368,853
DEVICE FOR USE IN MAKING TEMPLATES
Filed Nov. 4, 1942   5 Sheets-Sheet 1

Fig. 1.

INVENTOR

Feb. 6, 1945.  V. J. LEVAGGI, JR  2,368,853
DEVICE FOR USE IN MAKING TEMPLATES
Filed Nov. 4, 1942   5 Sheets-Sheet 2

Fig. 3.

Feb. 6, 1945. V. J. LEVAGGI, JR 2,368,853
DEVICE FOR USE IN MAKING TEMPLATES
Filed Nov. 4, 1942 5 Sheets-Sheet 4

Feb. 6, 1945.   V. J. LEVAGGI, JR   2,368,853
DEVICE FOR USE IN MAKING TEMPLATES
Filed Nov. 4, 1942   5 Sheets-Sheet 5

Patented Feb. 6, 1945

2,368,853

UNITED STATES PATENT OFFICE 2,368,853

DEVICE FOR USE IN MAKING TEMPLATES

Victor J. Levaggi, Jr., Beverly, Mass., assignor, by mesne assignments, to United Last Company, Portland, Maine, a corporation of Maine Application November 4, 1942, Serial No. 464,554

17 Claims. (Cl. 164—34)

The object of the present invention is to provide improved apparatus for making templates, and is herein set forth with regard particularly to the problems of making templates from lasts and models thereof.

A full complement of templates required by a last-maker or model-maker should include lengthwise templates and girthwise templates. Both kinds are within the provisions of the apparatus herein illustrated, and they may be total or partial according to the use to be made of them. To save time in producing a template the apparatus is provided with a scriber adapted to score or scratch a line in a sheet of template material, the line representing the selected contour of the subject last or model. Then, if, as preferred, the template material is flexible, frangible and not too thick it may be easily broken on the scored line with the result that two counterpartal templates are produced. Thin Celluloid has the characteristics above mentioned and is suitable for the purposes in view, since the edges produced by scoring and breaking do not require any subsequent treatment.

A novel feature of the invention is embodied in a combination of elements including means for holding and carrying a recording sheet and an object of which a contour is desired, the object illustrated being a last. The recording sheet and the last are thereby maintained in fixed relation, one to the other, with provision for rotation about an axis and for movements of translation in all directions radial with respect to that axis but not otherwise. The combination also includes a tracer and a marking element arranged to engage the last and the recording sheet respectively. These also are maintained in fixed relation, one to the other. Moreover, the axis above mentioned is maintained parallel with a line intersecting the engagement points of the tracer and the marking element despite the movements of translation of which the axis is capable.

The feature above set forth not only insures fidelity of scribed contours, but if the marking element is a sharp scoring tool and the recording sheet has the characteristics mentioned the recording may be quickly converted into mated templates by breaking the sheet as described.

Use of the illustrated apparatus involves maintaining a last 10 or other object of which a template is to be made, and a sheet of template material 12 in engagement, respectively, with a tracer point 14, and an incising tool 16 (Figs. 1 and 5), the latter being adapted to make an incision extending only part way through the template material along a contour corresponding exactly to the contour of the last 10 which is engaged by the tracer point 14. The last 10 and template material 12 are constrained to simple rotation about an axis and movements of translation in any direction in a plane which is perpendicular to that axis and to a line connecting the tracer point 14 and tool 16. The last is supported in a holder comprising a shaft 18 which is rotatably mounted in an arm 20, the latter being hinged at 22, 22 (Fig. 1) to another arm 24. The arm 24 is hinged at 26, 26 to a bracket 28 which is fixed to a post 30 adapted to stand on a bench or on the floor. The axes about which the shaft 18 and the arms 20 and 24 can pivot or swing are all parallel to each other.

The last 10 is supported with the section or contour of it of which a template is to be made positioned in coincidence with a plane passing through the tracer point 14 and perpendicular to the axis of the shaft 18, on three pointed screws 32, the screws being threaded for heightwise adjustment in a Y-shaped plate 34 (best shown in Figs. 3 and 7) which is fixed to the upper end of the shaft 18 by a nut 35 threaded on the shaft. To assist in positioning the last on the three screws 32 and holding it thereon while the screws are being adjusted, a forked toe stop or gage 36 (Fig. 3) is adapted to be swung into engagement with the toe end of the last about a pin 38 extending from one side of a member 40 fixed to the plate 34. Similarly, a spring clip 42 (Fig. 1) is arranged to be swung horizontally about a screw 44 threaded into the plate 34 into engagement with the heel end of the last to position and hold the heel end on the screws 32. When, by proper adjustment of the screws 32, the last 10 is supported in the desired position relatively to the tracer point 14, the last is clamped against the screws 32 by a spur member 46 which is threaded into the outer end of an arm 48 mounted for heightwise adjustment on a rod 50, the latter being threaded into a collar 51 fixed to the shaft 18.

Figure 4:
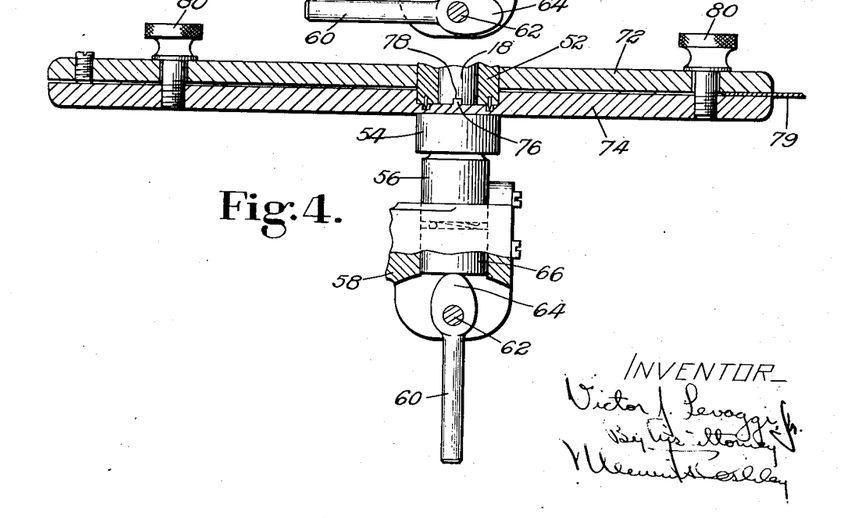
Fig. 4 is a sectional elevation of the holder for the template material shown in Fig. 3, the section being taken lengthwise of the holder.

The sheet of template material 12 is held in a plane perpendicular to the axis of the shaft 18 at the lower end of that shaft between a collar 52, pinned to the shaft, and a table 54 which is rotatably mounted on the upper end of a support 56, the support being mounted for vertical or heightwise movement in the outer end of an arm 58 fixed to the swingable arm 20. The table 54 is normally disposed a short distance below the collar 52 to permit a piece of template material to be readily inserted therebetween and to be adjusted so that it is located directly under the contour of the object or model of which a template is to be made. After the template material has been properly positioned under the model, a clamp 60, which is pivoted at 62 to the arm 58, is swung downwardly, as illustrated in Fig. 4, to cause a cam 64 on the clamp to engage a plunger 66 slidably mounted in the arm 58 and thus to move the plunger upwardly in the arm 58. A coiled spring 68 is interposed between the plunger 66 and the support 56 whereby the table 54 is caused yieldingly to press against the template material 12 and to hold it against the fixed collar 52. The insure against any rotation or other movement of the template material 12 relative to the last 10, spurs 70, extending downwardly from the collar 52, are provided which will be driven into the template material 12 when the latter is forced upwardly against the fixed collar 52.

If it is desired to make a template of only a small portion of the last 10, such as the contour of its heel end or toe end only, it is more convenient and desirable to use a small piece of template material. For this purpose an alternative form of holder such as that illustrated in Fig. 4 is provided for use. This alternative holder comprises upper and lower plates 72 and 74, respectively, which are bored at their central portion to receive the fixed collar 52 above referred to. The lower plate 74 has a key 76 thereon which is received in a keyway 78 cut in the lower end of the shaft 18 to provide a driving connection between this shaft and the plate 74. The plate 74 is held firmly against the shaft 18 and collar 52 by the rotatable table 54 which is supported and controlled in the manner described above. A small piece of template material 79, upon being inserted between the plates 72 and 74, is clamped therebetween by means of screws 80 which pass freely through the upper plate 72 and are threaded into the lower plate 74.

Figure 2:
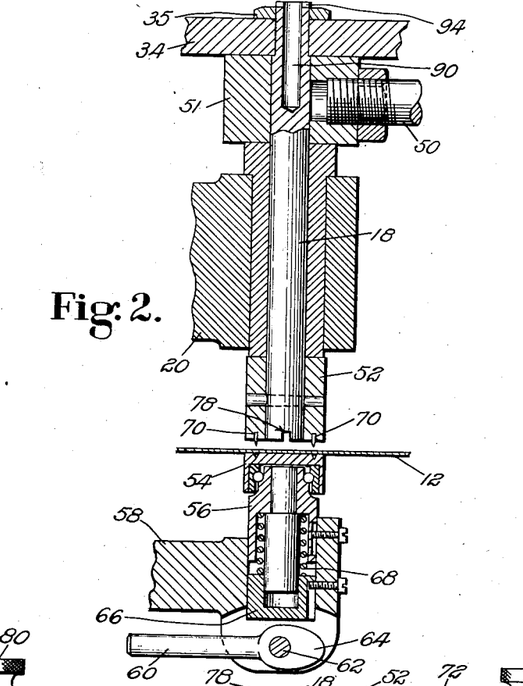
Fig. 2 is a sectional view illustrating the holder for the template material in the device shown in Fig. 1.
Figures 7, 8:
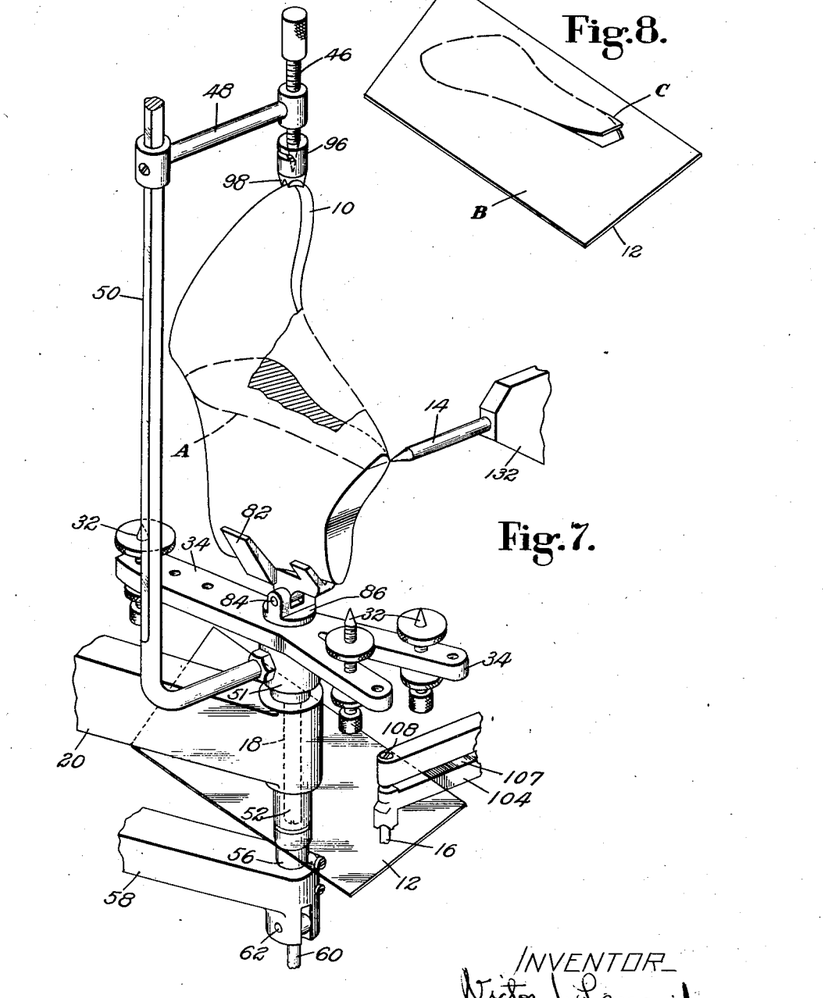
Fig. 7 is a perspective view of an alternative form of holder for use in presenting a last to the tracer point along a section of the last extending substantially perpendicular to the turning axis of the last.
Fig. 8 is a view in perspective of a sheet of template material in which the last contour illustrated in Fig. 7 has been incised, one portion of the template material having been broken away from the remainder of the material.

If a template is to be made of a transverse section of the last 10, the latter is mounted in the device with its longitudinal axis disposed substantially parallel to the axis of the shaft 18, as illustrated in Fig. 7. A last in this position in the device is supported at its heel end by a forked support 82 which is pivoted at 84 to a pad 86 having a stud 88 (Fig. 10) adapted to be received in a hole 90 (Fig. 2) in the shaft 18. A driving connection between the shaft 18 and the pad 86 is provided by a key 92 fixed to the pad and a keyway 94 formed in the shaft. The last 10 is clamped against the forked member 82 by turning the threaded spur 46 to the lower end of which, in the present instance, is fitted a member 96 (Figs. 7 and 11) the lower end of which is slotted at 98 to receive the toe end of the last. The member 96 is bored to receive the end of the spur 46 and turns freely thereon. A spring clip 99 (Fig. 11) is fitted into a groove 100 in the member 96 and runs in another shallow groove 102 formed in the spur 46. Thus, the member 96 can quickly be snapped on and off the spur.

Figure 1:
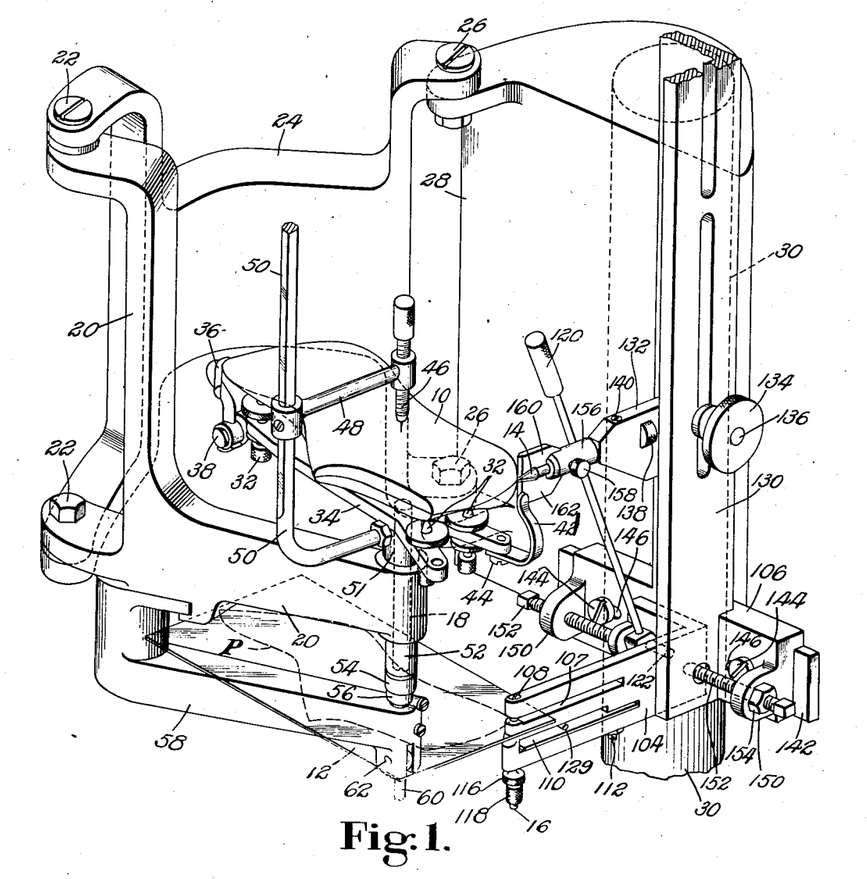
Fig. 1 is a perspective view of an illustrative device embodying the invention.
Figures 5, 6, 9, 10, 11:
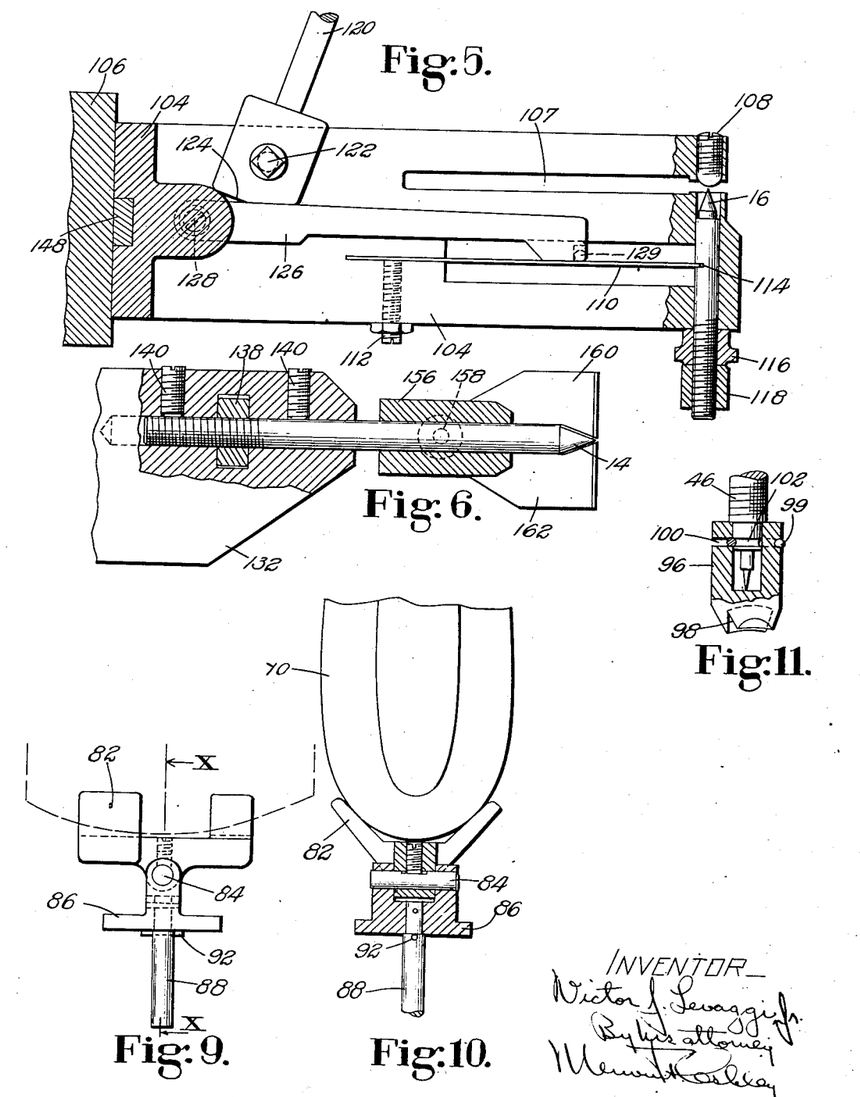
Fig. 5 is an elevational view, partly in section, of the mechanism for incising the template material.
Fig. 6 is an elevation, partly in section, of the tracer point and member by which the last and template material are guided.
Fig. 9 is a side elevation of the last-holding device illustrated in Fig. 7.
Fig. 10 is a sectional elevation of the device shown in Fig. 9, the section being taken along the line X—X of Fig. 9.
Fig. 11 is a fragmentary sectional view of a last-holding device adapted to engage the toe end of a last mounted as shown in Fig. 7.

The incising tool 16 is mounted for vertical movement in the outer end of an arm 104 which is mounted for adjustment horizontally on a slide 106 (Fig. 1). The arm 104 has an elongated slot 107 formed therein (Figs. 1 and 5) which provides clearance space for the template material 12, the upper surface of the template material being engaged by a fixed platen at the same level as the lower end of the fixed collar 52. The platen is the lower end of a screw 108 set into the arm 104, as shown in Fig. 5. The incising tool 16 is yieldingly held in engagement with the template material by a leaf spring 110 which is clamped in the arm 104 by a set screw 112 and the outer end of which is received in a slot 114 in the incising tool. The strength of the spring 110 is sufficient to cause the tool 16 to be driven into the template material, this movement of the tool being adjustable, however, and being limited by a nut 116 threaded on the lower portion of the tool and arranged to engage the under side of the arm 104. The nut 116 is held in adjusted position on the tool by a locking nut 118.

The incising tool 16 can be retracted from the template material at any time, for a purpose to be explained hereinafter, by swinging a lever 120 from the forwardly inclined position illustrated in Figs. 1 and 5 into a rearwardly inclined position, the lever 120 being pivoted at 122 to the arm 104. When the lever is moved into its rearward position, a cam surface 124 (Fig. 5) on its lower end swings a lever 126 downwardly, the lever 126 being pivoted by a screw 128 to the arm 104. The outer end of the lever 126 has a pin 129 fixed thereto which overlies the leaf spring 110 and presses it downwardly when the lever 126 is moved downwardly by the cam 124. By moving the lever 120 forwardly into the position illustrated in Figs. 1 and 5, the spring 110 is released sufficiently to permit the incising tool to be driven into the template material.

Extending upwardly from the slide 106 and formed integrally therewith is a bracket 130 (Fig. 1) to which may be clamped at any desired height a vertical plate 132 which is bored to receive the tracer point 14, as shown in Figs. 1 and 6. The plate 132 is held in adjusted position on the bracket 130 by a clamping nut 134 which is threaded on a stud 136 fixed to the plate. An adjusting nut 138, which is received in a slot in the plate 132, is threaded on the tracer point 14, as shown in Fig. 6, so that the latter may be adjusted lengthwise by turning the nut to bring the forward end of the tracer point into coincidence with the axis of the incising tool 16. After the tracer point has been adjusted it may be clamped in position by screws 140.

The point of the tracer 14 and the point of the tool 16 should be located in a line parallel with the axis of the shaft 18. For this purpose the slide 106 is adjustably mounted for sliding movement on a stationary guideway 142 (Fig. 1) carried by the fixed bracket 28, the slide being secured to the guideway 142 by screws 144 threaded into the guideway and passing through slots 146 in the slide. The arm 104, which carries the incising tool 16, is adjustably mounted on the forward surface of the slide by means of a key 148 (Fig. 5) which fits into a keyway formed in the arm 104, thereby permitting the arm to be moved widthwise relatively to the slide and bracket 130. The slide has a pair of lugs 150 projecting forwardly from its opposite ends through which are threaded horizontal screws 152 the inner ends of which abut against the opposite sides of the arm 104, the right-hand screw, as viewed in Fig. 1, passing through a hole in the bracket 130. The screws 152 may thus be adjusted to position the arm 104 widthwise on the slide 106 until the axis of the incising tool 16 is located in exact alinement with the axis of the tracer point 14, the screws 152 being secured in adjusted position by locking nuts 154 threaded thereon and arranged to engage the lugs 150.

As pointed out above, it is desirable that the present device be adapted to make templates of the shapes or contours of the end portions of lasts and last models and also templates of the contours of different cross-sections thereof. It is also desirable that the device be able to produce templates which correspond in shape to the projection of the profile of the last or model in a given direction, or some portion of such profile, as distinguished from the shape or contour of the last in some predetermined plane. In other words, while the contour of the last in any given plane will be a certain predetermined shape, its profile or outline over the same portion would not necessarily be the same shape as the contour in view of the different curvatures of the surface of the last. The profile of the last or other object in a given direction would include only the high points of the surface of the object that would be projected onto a plane perpendicular to the direction in which the profile was made, whereas the contour of the last in a particular plane would correspond exactly to the periphery or outline of the last in that plane.

Figure 3:
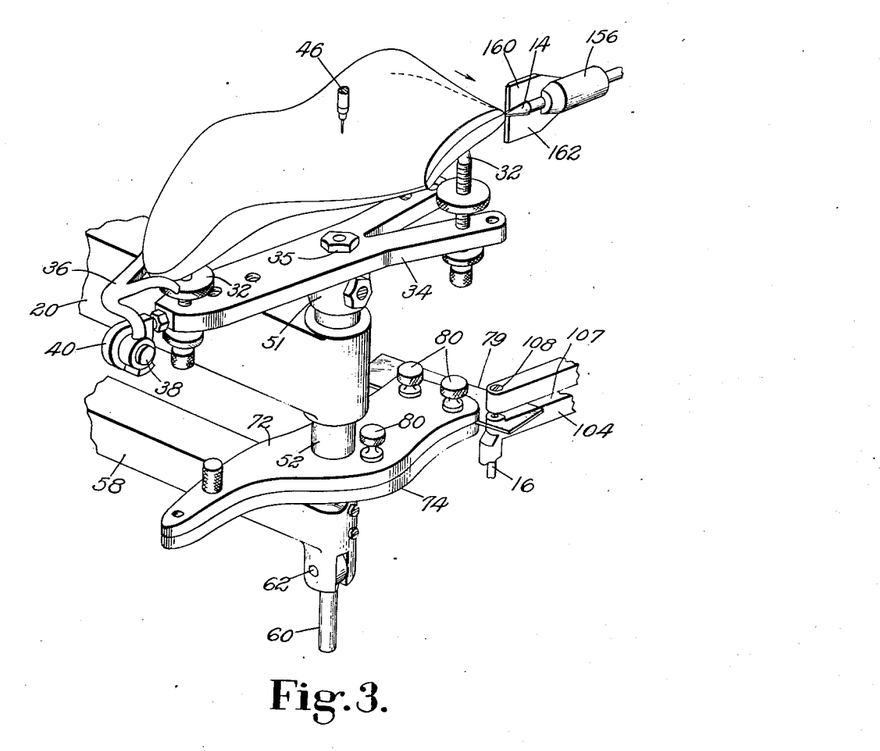
Fig. 3 is a perspective view of an alternative form of holder for the template material and shows the relation of the holder to a last mounted in the device.

In order to permit templates of the profiles of lasts or models to be made, therefore, the tracer point 14 has removably secured thereto a sleeve or collar 156 (Figs. 1 and 6) fastened to the tracer point by a thumb screw 158 and carrying at its forward end a pair of thin plates or fins 160, 162, these fins being integral with the sleeve at opposite sides thereof and extending forwardly to surround the tracer point, as shown in Fig. 6. the front edges of the fins being sharpened to form a thin straight edge of considerable length which is located in alinement with the operative end of the tracer point and in coincidence with the axis of the tool 16 so that the fins, in effect, widen the tracer point a substantial amount. Consequently, when it is desired to produce a template of the full profile of the last in a given direction or plane, as illustrated in Fig. 1, or to make a template of the profile of only a portion of the last, for example, the heel portion, as shown in Fig. 3, the sleeve 156 is attached to the tracer point 14 so that the tracer point will comprise a wide, straight edge that will engage only the high points on the surface of the last presented thereto as the last is moved past the tracer point and fins 160, 162, thereby causing the incising tool 16 to make an incision in the template material 12 (Fig. 1) which corresponds in shape to the outline or profile of the last rather than to its contour in any particular plane. When it is desired to make a template of the last in a particular plane or cross-section thereof, as illustrated in Fig. 7, the sleeve 156 may be readily removed to permit the tracer point to follow the exact contour of the last in the selected plane. Fig. 8 shows a pair of templates of the contour of the last 10 formed on the plane or cross-section of the last designated by the letter A in Fig. 7, the last contour in this plane lying wholly within the edges of the template material 12 and thus producing an inside or female template B and an outside or male template C, both of which comprise complete closed sectional contours of the last in the plane indicated.

In the use of the device in practicing the method illustrated herein, the operator mounts the object of which a template is to be made, for example, the last 10 of Fig. 1, on the three screws 32, the last being initially positioned and held on the screws, as described above, by the forked toe stop 36 and heel clip 42. He adjusts the screws 32 until the last is supported in the desired heightwise position relatively to the tracer point 16 and then clamps the last in its adjusted position by the spur 46, after which the toe stop 36 and heel clip 42 may be swung out of the way, as shown in Fig. 1, so that they will not interfere with the operation of the tracer point.

The operator mounts the sheet of template material 12, of sufficient size to produce the desired template, on the rotary table 54 in a position to underlie the last 10 and he then operates the clamp 60 (Fig. 2) to move the table upwardly against the fixed collar 52 and to cause the spurs 70 to be driven into the template material and hold it against rotative movement relatively to the last 10. As herein illustrated, the template material comprises a relatively thin sheet of Celluloid or similar material although other sheet materials which can be cut or scratched by an incising tool and which will break accurately and cleanly along the incision could obviously be used such, for example, as "Bakelite" or similar manufactured sheet materials.

The operator next swings the lever 120 from a rearward position into the forwardly inclined position illustrated in Figs. 1 and 5 to permit the incising tool to move upwardly and be driven into the template material by the leaf spring 110. In making a template of the profile of the last 10, as illustrated in Fig. 1, or of the contour of the last on a predetermined plane extending lengthwise of the last, the operator will normally start the operation at some convenient point along the desired contour as, for example, at the base of the heel or the tip end of the toe, and work forwardly or rearwardly, as the case may be, by rotating the last (and template material)

about the axis of the shaft 18 with the last held against the tracer point 14 until he reaches an acute or sharp angle in the contour or some other suitable stopping point and he will then retract the incising tool 16 and swing the last and template material around and start again in the opposite direction from the said angle or other stopping point. In this way an accurate reproduction of the contour of the object may be obtained irrespective of acute angles, sharp curvatures, or other irregular shapes along the periphery or contour to be reproduced. For this reason, the cutting action of the incising tool 16 may be interrupted at any time, as explained above, and the tool retracted to permit the operator to rotate the last or model into another position and then to proceed to complete the incising of the template material in an opposite direction, the hinged arms 20 and 24 and the rotatable shaft 18 permitting this movement of the last relatively to the tracer point 14.

When the last has been rotated completely around relatively to the tracer point 14, the template material has an incision formed on its lower surface which is an exact reproduction of the profile of the last, or of the contour of the last on the plane thereof which it was desired to reproduce in the template, the profile of the last reproduced in the template material in Fig. 1 being indicated by the broken line P. After the template material has been incised as described, it may be removed from the device by releasing the clamp 60 and the template or pair of templates may be completed, as illustrated in Fig. 8, by breaking the material along the incision to produce the finished templates. Since the material is of such a nature that it will break readily along the incision in a smooth sharp line, no trimming or shaping of the templates will be necessary. Because of the fact that no template material is lost in forming the template by breaking the material along the incision formed therein, two exactly complementary templates are produced simultaneously. If the incision of the contour of the last or other object is contained wholly within the area of the template material, as illustrated in Figs. 1 and 8, the resulting templates represent complete sectional contours of the last or object and any reproductions of the object may be accurately tested by inserting them into the female template, as mentioned above.

If a template of only a portion of the contour of the object is to be made, as for example, a template of the contour of the heel end of the last 10, a relatively small piece of template material may be used and the holder or clamp 72, 74, illustrated in Fig. 4, may be employed instead of the table 54 for holding the template material in the device, this holder or clamp being mounted on the collar 52 on the shaft 18 and being held thereon by elevation of the table 54 by the clamp 60. The small piece of template material is inserted between the plates 72, 74 and is clamped therebetween by tightening the screws 80.

As pointed out above, when it is desired to make a template of the contour of a transverse section of the last, as illustrated in Fig. 7, the last is mounted in the device with its longitudinal axis substantially parallel to the axis of the shaft 18 and with its heel end supported by the forked member 82 and its toe end held by the split member 96 which will be fitted onto the spur 46. When a template of a contour of the last in a predetermined plane is desired, as distinguished from the profile of the last in a given direction, the sleeve 156 with the fins 160, 162 will be removed from the tracer point 14 to permit the latter to engage the last around the complete contour thereof on the section or plane of the last of which a template is desired.

Having described my invention, what I claim as new and desire to secure by Letters Patent of the United States is:

1. In a template making device, a tracer point, a tool, and a holder for presenting a last to said tracer point and a sheet of template material to said tool, said last and template material being mounted to rotate freely together relatively to said holder about an axis parallel to a line intersecting said tool and tracer point, and said holder being constructed and arranged to permit the axis about which said last and template material rotate to be moved parallel to itself in any direction.

2. In a template making device, a tracer point, a tool, and a holder for presenting a last to said tracer point and a sheet of template material to said tool, said last and template material being arranged to rotate freely together in said holder about an axis perpendicular to the template material and parallel to a line intersecting the tool and tracer point, and said last and template material being also movable bodily with said holder about two other axes parallel to said line and to said first-named axis to permit the last and template material to be swung together and presented by said holder to the tracer point and tool, respectively, over all points on a contour of the last defined by any plane parallel to the template material.

3. In a template making device, a tool, a tracer point, and a holder for presenting a last to said tracer point and a sheet of template material to said tool, said holder comprising an arm mounted to swing about an axis parallel to a line intersecting said tool and tracer point, and a second arm arranged to swing on the first-named arm about another axis parallel to said line, said last and template material being mounted to rotate freely together with respect to said second arm about another axis parallel to said line and perpendicular to said template material, whereby all points on a contour of the last defined by a plane parallel to said template material may be presented to said tracer point.

4. In a template making device, an incising tool, a tracer point, said tool and tracer point being fixed relatively to each other, a holder for receiving a last and a sheet of template material and for presenting them respectively to the tracer point and tool, said holder comprising an arm arranged to swing about an axis parallel to a line intersecting the tool and tracer point, a second arm pivoted on the first-named arm and arranged to swing thereon about another axis parallel to said line, and means on the second arm arranged to permit free rotation of the last and template material together relatively to said second arm about another axis parallel to said line and to the two first-named axes, thereby permitting said holder to present the last and template material to the tracer point and tool so that all points on a contour of the last in a plane parallel to the template material may be engaged by said tracer point, and so that all points corresponding to said contour on the template material may be engaged by said tool.

5. In a template making device, an incising tool, a tracer point positioned at right angles thereto, said tool and tracer point being relatively fixed and having their operative ends in alinement with each other in the direction of the length of said tool, a holder for presenting a last to said tracer point and a sheet of template material to said tool, said holder comprising an arm arranged to swing about an axis parallel to a line passing through said tool and tracer point, a second arm pivoted on the first arm and arranged to swing about another axis parallel to said line, mechanism on the second arm for clamping the template material against movement relatively to said mechanism, and means on said second arm for holding the last in a predetermined position relatively to the template material, said mechanism and means being constructed and arranged to rotate freely together on said second arm about an axis parallel to said line and to the two first-named axes, thereby permitting the holder to present the last and template material to the tracer point and tool, respectively, in such a manner that all points on a contour of the last defined by a plane parallel to the template material may be presented to the tracer point, and all points on the template material in any direction in its own plane may be presented to said tool.

6. In a template making device, an incising tool, a tracer point, a holder for a last and for a sheet of template material, said holder being movable to present said last and template material to the tracer point and tool, respectively, said tracer point and tool being fixed relatively to each other and to said holder and having their operative ends located in alinement with each other in a direction perpendicular to the direction of movement of the holder, said holder being swingable about a fixed axis parallel to a line intersecting the tracer point and tool and being also swingable about a movable axis which is parallel to said line and said fixed axis and is movable about said fixed axis, thereby providing a swingable hinge arrangement capable of permitting the last and template material to move in any direction in a plane perpendicular to said axes, and said holder being also constructed and arranged to hold the last and template material in predetermined fixed relation to each other while permitting them to rotate freely together about another axis parallel to said line and said first-named axes.

7. In a template making device, an incising tool, a tracer point, a holder for presenting a last and a sheet of template material to said tracer point and tool, respectively, said holder being movable to permit the template material to be presented to said tool in any direction in the plane of said material and thereby to cause an incision to be made in said material along a contour which corresponds to a contour of the last engaged by said tracer point, means for supporting the template material against the pressure of said tool, said tool being mounted for movement toward and away from said supporting means, means for limiting the movement of said tool toward the supporting means, and means for retracting the tool away from said supporting means.

8. In a template making device, an incising tool, a tracer point, a holder for presenting a last and a sheet of template material, respectively, to said tracer point and tool, said holder being movable to permit said template material to be presented to said tool in any direction in the plane of said material, whereby an incision is made in the template material along a contour like that of the last engaged by said tracer point, means for supporting the template material against the pressure of said tool, said tool being mounted for movement toward and away from said supporting means, means for adjustably limiting the movement of said tool toward said supporting means, and means for retracting said tool at will away from said supporting means and for thereafter maintaining said tool in its retracted position.

9. In a template making device, an incising tool, a tracer point, a holder for a last and a sheet of template material adapted to present them to the tracer point and tool, respectively, to cause an incision to be made in said material which is exactly like a contour of the last engaged by said tracer point, said tracer point and tool being fixed at right angles to each other with their operative ends in alinement in a direction perpendicular to the template material, means for adjusting the tracer point and tool relatively to the last and template material, respectively, and means for adjusting said tracer point and tool relatively to each other to position their operative ends in said alinement.

10. In a template making device, an incising tool, a tracer point, a holder for a last and for a sheet of template material, said holder being movable to present the last and template material to the tracer point and tool, respectively, to cause an incision to be made in said template material which will correspond in shape to a contour of the last engaged by said tracer point, said tracer point and tool being supported at right angles in fixed relation to each other with their work-engaging ends in alinement with respect to a perpendicular to the template material, means for adjusting said tracer point relatively to the last to position it in accordance with the contour of the last of which a template is to be made, and additional means for relatively adjusting said tracer point and tool to maintain their work-engaging ends in said perpendicular alinement.

11. In a template making device, an incising tool, a tracer point, a holder for a last and a sheet of template material, said holder being movable to present the last and template material to the tracer point and tool, respectively, to cause an incision to be formed in said material which corresponds to that contour of the last which is engaged by said tracer point, said tracer point and tool being supported in fixed relation at right angles to each other with their operative ends in exact alinement in a direction perpendicular to the plane of the template material, means for adjusting said tracer point heightwise to position it for engaging the particular contour of the last of which a template is to be made, additional means for adjusting the tracer point forwardly and rearwardly of the device to position the operative ends of said tracer point and tool in alinement with each other in that direction, and means for adjusting the incising tool widthwise of the device to position said operative ends in alinement in a widthwise direction.

12. In a template making device, an incising tool, a tracer point, a holder for presenting a last and a sheet of template material to said tracer point and tool, respectively, to cause an incision to be made in said material which corresponds in outline to a contour of the last engaged by said tracer point, means on said holder for engaging the last and supporting it in a predetermined position thereon, and means for initially positioning the last on the supporting means when the last is being mounted thereon, said positioning means being movable to permit its removal from operative position after the last has been mounted on said supporting means.

13. In a template making device, an incising tool, a tracer point, a holder for presenting a last and a sheet of template material to the tracer point and tool, respectively, to cause an incision to be made in said material which corresponds in outline to a contour of the last which is engaged by said tracer point, means on the holder for supporting the last and for clamping it thereon, said means being adjustable to position the last heightwise relatively to said tracer point, and means on said holder for initially positioning the last laterally of said supporting means when the last is being placed thereon, said positioning means being pivotally mounted relatively to said holder to permit the removal of said means from operative position after the last has been positioned laterally of said supporting means.

14. In a template making device, an incising tool, a tracer point, and a holder for presenting a last and a sheet of template material to said tracer point and tool, respectively, said holder being movable to present said template material to said tool over all portions thereof in the plane of said material and thereby to permit said tool to make an incision in said material which corresponds in outline to a contour of the last engaged by said tracer point, and said tracer point being constructed and arranged to engage only the high points of the surface of the last over the portions of said surface presented thereto, thereby causing said tracer point and tool, respectively, to describe contours which correspond in shape to the profile of the last in a plane perpendicular to the portion of the surface of the last engaged by said tracer point.

15. In a template making device, an incising tool, a tracer point, said tracer point and tool being fixed relatively to each other, and a holder for presenting a last and a sheet of template material to said tracer point and tool, respectively, said holder being movable to present all portions of the last to said tracer point and to present the template material to said tool over all points in any direction in the plane of said material, thereby permitting said tool to make an incision in said template material which will correspond in shape to any contour of the last engaged by said tracer point, said tracer point having a last-engaging portion which comprises a sharp, straight edge of substantial length adapted to engage only the high points of the surface of the last presented to said tracer point, thereby causing the contours described by said tracer point and tool to conform in outline to the profile of the last taken in a direction perpendicular to the surface of the last engaged by said tracer point.

16. An apparatus for recording contours comprising means rotatable about an axis for maintaining an object and a recording sheet in a constant relation but spaced one from the other lengthwise of said axis, a fixed tracer arranged to be engaged by the object, a stationary marking element arranged to be engaged by one surface of the recording sheet, and articulated carrying means in which said rotatable means are journaled and by which said axis is maintained parallel with a line intersecting the engagement points of the tracer and the marking element, said carrying means being movable to carry said rotatable means with movements of translation in all directions radial with respect to said axis.

17. An apparatus as defined in claim 16 but also comprising a stationary platen confronting the marking element and arranged to maintain the recording sheet in contact therewith.

VICTOR J. LEVAGGI, Jr.